(12) United States Patent
Hamakita et al.

(10) Patent No.: US 9,657,811 B2
(45) Date of Patent: May 23, 2017

(54) WORM SPEED REDUCER

(71) Applicant: JTEKT CORPORATION, Osaka-shi, Osaka (JP)

(72) Inventors: Jun Hamakita, Kashihara (JP); Arata Kikuchi, Soraku-gun (JP)

(73) Assignee: JTEKT CORPORATION, Osaka-shi (JP)

( * ) Notice: Subject to any disclaimer, the term of this patent is extended or adjusted under 35 U.S.C. 154(b) by 0 days.

(21) Appl. No.: 14/836,034

(22) Filed: Aug. 26, 2015

(65) Prior Publication Data

US 2016/0069423 A1    Mar. 10, 2016

(30) Foreign Application Priority Data

Sep. 8, 2014   (JP) ................................. 2014-182565

(51) Int. Cl.
| | |
|---|---|
| *F16H 1/16* | (2006.01) |
| *B62D 5/04* | (2006.01) |
| *F16H 55/24* | (2006.01) |

(52) U.S. Cl.
CPC ............. *F16H 1/16* (2013.01); *B62D 5/0409* (2013.01); *F16H 55/24* (2013.01)

(58) Field of Classification Search
CPC ... F16H 1/16; F16H 1/18; F16H 55/24; F16H 2055/0866; F16H 57/12; B62D 5/0409; B62D 5/0454; B62D 7/22; B62D 7/226
USPC ................................................. 180/443, 444
See application file for complete search history.

(56) References Cited

U.S. PATENT DOCUMENTS

| | | | | |
|---|---|---|---|---|
| 8,727,065 | B2* | 5/2014 | Kuroumaru .......... | B62D 5/0409 180/443 |
| 9,033,096 | B2* | 5/2015 | Yoshikawa .......... | B62D 5/0409 180/444 |
| 2007/0193819 | A1* | 8/2007 | Iwasa ................... | B62D 5/0409 180/444 |
| 2010/0140011 | A1* | 6/2010 | Wilkes .................... | F16C 23/06 180/444 |

(Continued)

FOREIGN PATENT DOCUMENTS

| | | |
|---|---|---|
| DE | 102007011429 A1 | 9/2007 |
| EP | 2597014 A2 | 5/2013 |

(Continued)

OTHER PUBLICATIONS

Jan. 29, 2016 Extended Search Report issued in European Patent Application No. 15183451.2.

*Primary Examiner* — Victor MacArthur
(74) *Attorney, Agent, or Firm* — Oliff PLC (57) ABSTRACT

A center axis of a worm shaft is offset in an offset direction with respect to a plane that is orthogonal to a center axis of a worm wheel and that passes through a central position of the worm wheel in a tooth width direction. A bias member biases a second end of the worm shaft in a preloading direction in which a center distance between the worm shaft and the worm wheel decreases. When the worm shaft is configured like a right-hand thread, in a left-handed coordinate system, a direction toward a first end of the worm shaft in an axial direction (a direction toward an electric motor) corresponds to a thumb direction. The preloading direction corresponds to an index finger direction. The offset direction corresponds to a middle finger direction.

3 Claims, 8 Drawing Sheets

(56) References Cited

U.S. PATENT DOCUMENTS

| | | | | |
|---|---|---|---|---|
| 2011/0147112 A1* | 6/2011 | Suzuki | ............... | B29C 45/0055 180/444 |
| 2011/0303480 A1* | 12/2011 | Shimizu | ................... | B62D 1/16 180/444 |
| 2014/0008142 A1* | 1/2014 | Yoshikawa | .......... | B62D 5/0409 180/444 |

FOREIGN PATENT DOCUMENTS

| | | | |
|---|---|---|---|
| JP | 2006-103395 | A | 4/2006 |
| JP | 2010116090 | A | 5/2010 |
| JP | 2013108569 | A | 6/2013 |
| WO | 03086836 | A2 | 10/2003 |

* cited by examiner

FIG.9B
CONVENTIONAL EXAMPLE

WORM SPEED REDUCER

INCORPORATION BY REFERENCE

The disclosure of Japanese Patent Application No. 2014-182565 filed on Sep. 8, 2014 including the specification, drawings and abstract, is incorporated herein by reference in its entirety.

BACKGROUND OF THE INVENTION

1. Field of the Invention

The present invention relates to a worm speed reducer.

2. Description of Related Art

In an electric power steering system, rotation output from an electric motor is transmitted to a worm shaft of a worm speed reducer. The speed of the rotation output from the electric motor is reduced with a worm wheel that meshes with the worm shaft. The resultant rotation is transmitted to a steering operation mechanism to assist generating a torque needed for a steering operation. Backlash is needed to allow the worm shaft and the worm wheel to mesh with each other. However, tooth hammering noise (rattling noise) may be caused by the backlash during traveling.

Thus, an electric power steering system has been proposed, in which the worm shaft is supported such that a first end of the worm shaft pivots around a second end of the worm shaft and the first end is elastically biased toward the worm wheel by a bias member, thereby eliminating the backlash based on the above-described configuration. Typically, the worm shaft is configured like a right-hand thread. Only when the worm shaft, configured like a right-hand thread, rotates clockwise, a meshing reaction force (driving reaction force) that the worm shaft receives from the worm wheel in a meshing area induces a moment that biases a meshing portion of the worm shaft toward the worm wheel (the same direction as the biasing direction of the bias member) around the second end of the worm shaft.

Therefore, meshing frictional resistance generated when the worm shaft rotates clockwise is larger than meshing frictional resistance generated when the worm shaft rotates counterclockwise. Thus, frictional resistance torque generated in the former case is higher than frictional resistance torque generated in the latter case. As a result, steering feeling may vary according to a steering direction. On the other hand, techniques for the electric power steering system have been proposed: the technique in which a pair of tooth flanks of the worm shaft has different pressure angles and the technique in which a pair of tooth flanks of each tooth of the worm wheel has different pressure angles (see, For example, Japanese Patent Application Publication No. 2006-103395 (JP 2006-103395 A) (paragraph [0041] and FIG. 5)).

The technique in JP 2006-103395 A (paragraph [0041] and FIG. 5) is expected to provide an effect that suppresses a difference in frictional resistance torque due to a difference in rotating direction.

However, for the worm shaft and the worm wheel, a cutting tool with a special shape is needed to provide a pair of tooth flanks with different pressure angles. That is, a plurality of cutting tools is needed which has different shapes depending on the specification of the worm shaft or the worm wheel, resulting in increased manufacturing costs of the worm speed reducer as a whole.

SUMMARY OF THE INVENTION

An object of the present invention is to provide an inexpensive worm speed reducer that allows suppression of a difference in frictional resistance torque due to a difference in rotating direction.

A worm speed reducer according to an aspect of the present invention includes: a worm shaft having a first end coupled to an electric motor such that the worm shaft is driven by the electric motor, and a second end opposite to the first end in an axial direction of the worm shaft; a worm wheel with pairs of tooth flanks each pair defining a tooth groove; a housing that houses the worm shaft and the worm wheel and that supports the second end of the worm shaft such that the second end of the worm shaft is able to pivot around the first end of the worm shaft; and a bias member that is supported by the housing and that elastically biases the second end of the worm shaft in a preloading direction in which a center distance between the worm shaft and the worm wheel decreases. A center axis of the worm shaft is offset in an offset direction with respect to a plane that is orthogonal to a center axis of the worm wheel and that passes through a central position of the worm wheel in a tooth width direction thereof. In a left-handed coordinate system for a case where the worm shaft is configured like a right-hand thread and in a right-handed coordinate system for a case where the worm shaft is configured like a left-hand thread, when a direction toward a first end of the worm shaft in the axial direction is set to correspond to a thumb direction and the preloading direction is set to correspond to an index finger direction, the offset direction corresponds to a middle finger direction.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein:

FIG. 9A and FIG. 9B are diagrams illustrating that a tooth contact area varies depending on a rotating direction of the worm wheel.

DETAILED DESCRIPTION OF EMBODIMENTS

Figure 1:
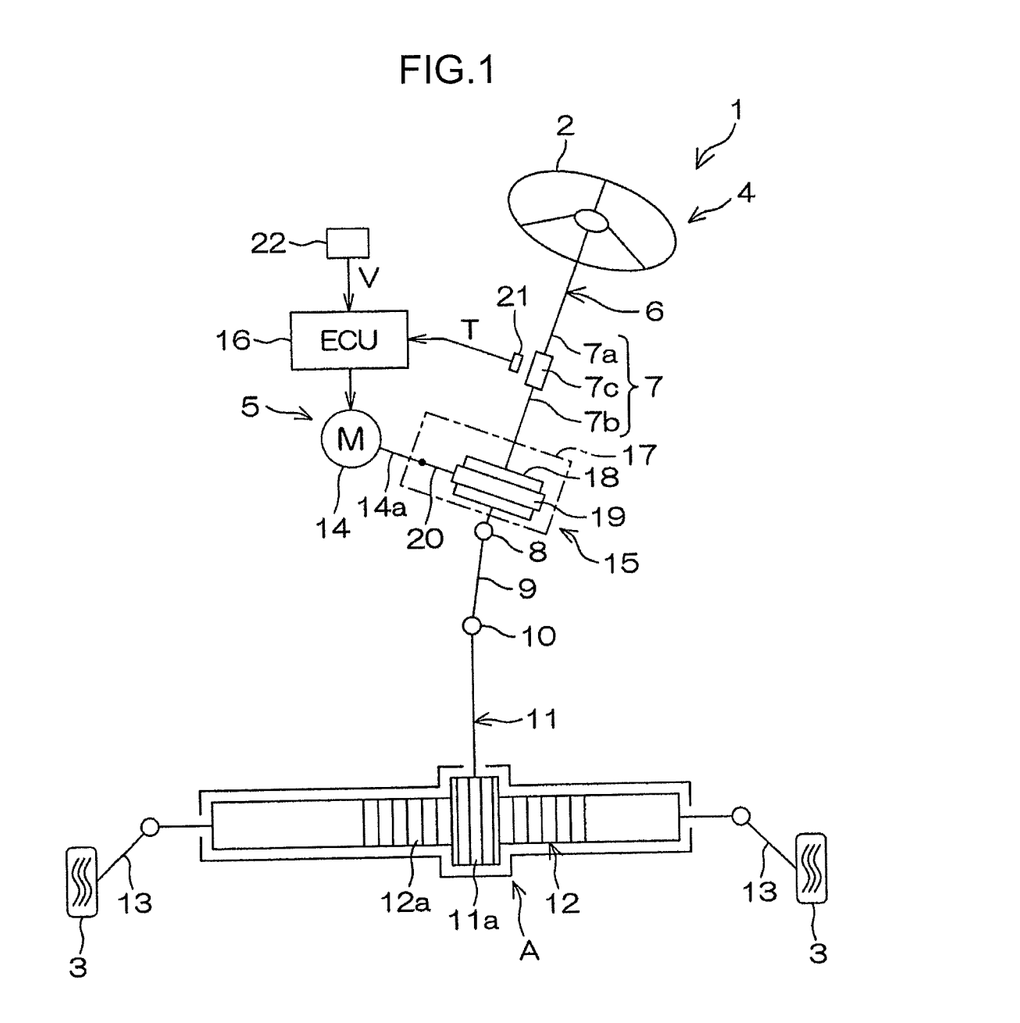
FIG. 1 is a schematic diagram of an electric power steering system to which a worm speed reducer of an embodiment of the present invention is applied.

An embodiment of the present invention will be described below with reference to the drawings. FIG. 1 is a schematic diagram of an electric power steering system including a worm speed reducer of an embodiment of the present invention. As depicted in FIG. 1, an electric power steering system 1 includes a steering mechanism 4 that steers steered wheels 3 based on a driver's operation of a steering wheel 2 (steering member), and an assist mechanism 5 that assists the driver's steering operation.

The steering mechanism 4 includes a steering shaft 6 serving as a rotating shaft of the steering wheel 2. The steering shaft 6 includes a column shaft 7, an intermediate shaft 9, and a pinion shaft 11. The column shaft 7 is coupled to the center of the steering wheel 2. The intermediate shaft 9 is coupled to one end (a lower end in an axial direction) of the column shaft 7 via a universal joint 8. The pinion shaft 11 is coupled to one end (a lower end in an axial direction) of the intermediate shaft 9 via a universal joint 10.

The column shaft 7 includes an input shaft 7a, an output shaft 7b, and a torsion bar 7c. The input shaft 7a is coupled to the steering wheel 2. The output shaft 7b is coupled to the intermediate shaft 9. The torsion bar 7c coaxially couples the input shaft 7a and the output shaft 7b together. A pinion 11a is provided at a lower end of the pinion shaft 11 in an axial direction. The steering mechanism 4 includes a rack shaft 12 on which a rack 12a meshing with the pinion 11a is formed. The pinion 11a and the rack 12a form a rack and pinion mechanism A that is a motion converting mechanism.

When the steering shaft 6 rotates in conjunction with the driver's steering operation, the rotary motion of the steering shaft 6 is converted into a reciprocating linear motion of the rack shaft 12 in an axial direction via the rack and pinion mechanism A. The reciprocating linear motion of the rack shaft 12 is transmitted to the steered wheels 3 via tie rods 13 respectively coupled to the opposite ends of the rack shaft 12. Thus, a steered angle of the steered wheels 3 is changed to change a traveling direction of a vehicle.

The assist mechanism 5 includes an electric motor 14, a worm speed reducer 15, and an electronic control unit (ECU) 16. The electric motor 14 applies an assist torque to the column shaft 7. The worm speed reducer 15 transmits rotation from the electric motor 14 to the column shaft 7. The ECU 16 controls operation of the electric motor 14. The worm speed reducer 15 includes a housing 17, a worm shaft 18, a worm wheel 19, and a power transmission joint 20. The worm wheel 19 meshes with the worm shaft 18. The power transmission joint 20 couples an output shaft 14a of the electric motor 14 and the worm shaft 18 together so as to enable torque transmission. The worm shaft 18, the worm wheel 19, and the power transmission joint 20 are housed in the housing 17.

Rotation of the electric motor 14 is transmitted to the column shaft 7 via the worm speed reducer 15 to apply a motor torque to the steering shaft 6, thus assisting a steering operation. The electric power steering system 1 is provided with a torque sensor 21 that detects a steering torque T based on relative rotation of an input shaft 7a and the output shaft 7b of the column shaft 7. The steering torque T is a torque applied to the steering shaft 6 during the driver's steering operation. On the other hand, the vehicle is provided with a vehicle speed sensor 22 that detects a vehicle speed V (a traveling speed of the vehicle).

The ECU 16 sets a target assist torque based on the detected steering torque T and the detected vehicle speed V. The ECU 16 feedback-controls a current supplied to the electric motor 14 so as to set the assist torque equal to a target assist torque. The assist torque is applied to the column shaft 7 by the electric motor 14. The present embodiment will be described taking an example where the electric power steering system 1 is of what is called a column assist type in which the electric motor 14 applies power to the column shaft 7. However, the present invention is not limited to this configuration but can be applied to an electric power steering system of what is called a pinion assist type in which the electric motor applies power to the pinion shaft.

Figure 2:
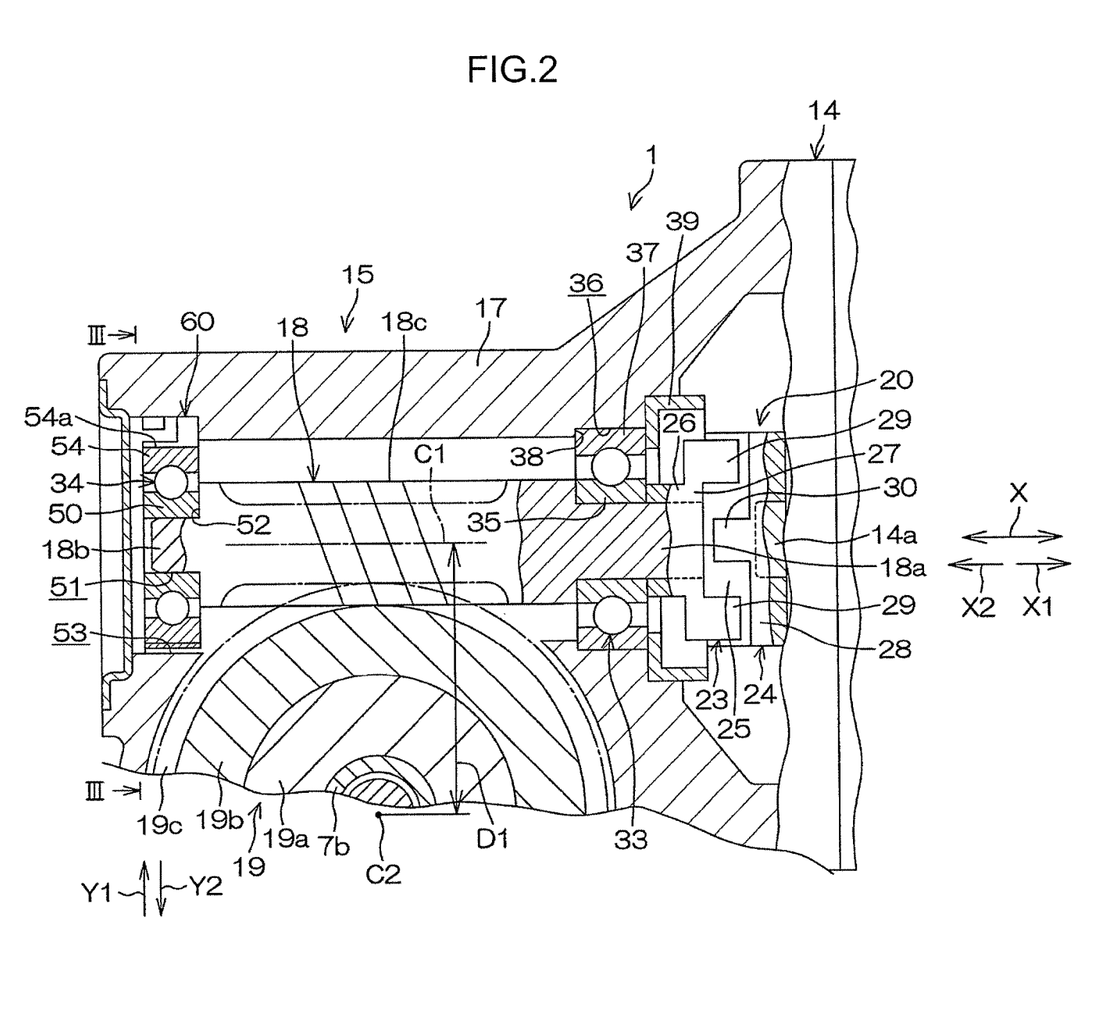
FIG. 2 is a sectional view of an important part of the electric power steering system.

As depicted in FIG. 2, the worm shaft 18 is arranged coaxially with the output shaft 14a of the electric motor 14. The output shaft 14a and the worm shaft 18 face each other in an axial direction X. That is, an end of the output shaft 14a and an end of the worm shaft 18 face each other in the axial direction X. The worm shaft 18 has a first end 18a, a second end 18b, and a tooth portion 18c. The first end 18a and the second end 18b are located away from each other in an axial length direction. The tooth portion 18c is provided in an intermediate portion between the first end 18a and the second end 18b.

The worm wheel 19 is coupled to an intermediate portion of the output shaft 7b of the column shaft 7 in the axial direction such that the worm wheel 19 is rotatable integrally with the output shaft 7b and immovable in the axial direction. The worm wheel 19 includes an annular core 19a and a resin member 19b. The core 19a is linked to the output shaft 7b so as to be rotatable integrally with the output shaft 7b. The resin member 19b surrounds the periphery of the core 19a and has a tooth portion 19c on its outer periphery. The core 19a is, for example, inserted into a mold when the resin member 19b is formed using resin.

The first end 18a of the worm shaft 18 and an end of the output shaft 14a of the electric motor 14 that faces the first end 18a are coupled together via the power transmission joint 20 so that torque can be transmitted between the ends and so that the worm shaft 18 and the output shaft 14a can pivot relative to each other. Specifically, the power transmission joint 20 includes a first rotating element 23, a second rotating element 24, and an intermediate element 25 including an elastic member such as rubber. The first rotating element 23 is coupled to the first end 18a of the worm shaft 18 so as to be rotatable integrally with the worm shaft 18. The second rotating element 24 is coupled to the output shaft 14a of the electric motor 14 so as to be rotatable integrally with the output shaft 14a. The intermediate element 25 is interposed between the first rotating element 23 and the second rotating element 24 to transmit torque between the rotating elements 23 and 24.

The first end 18a of the worm shaft 18 is rotatably supported by the housing 17 via a first bearing 33. The second end 18b of the worm shaft 18 is rotatably supported by the housing 17 via a second bearing 34. The elastic member of the intermediate element 25 of the power transmission joint 20 is elastically deformed to permit the worm shaft 18 to pivot around a bearing center of the first bearing 33 with respect to the output shaft 14a of the electric motor 14.

The first bearing 33 and the second bearing 34 are, for example, ball bearings. The first bearing 33 includes an inner ring 35 and an outer ring 37. The inner ring 35 is fitted in the first end 18a of the worm shaft 18 so as to be rotatable integrally with the worm shaft 18. The outer ring 37 is fixed to a bearing hole 36 formed in the housing 17. The outer ring 37 is sandwiched between a positioning step portion 38 and a locking member 39 in the axial direction. The positioning step portion 38 is provided at an end of the bearing hole 36. The locking member 39 is fitted, in a threadable manner, in a threaded portion formed in the bearing hole. Consequently, axial movement of the outer ring 37 is regulated.

An inner ring 50 of the second bearing 34 is coupled to a fitting recess portion 51 so as to be rotatable integrally with the worm shaft 18. The fitting recess portion 51 is formed on an outer periphery of the second end 18b of the worm shaft 18. One end surface of the inner ring 50 is in abutting contact with a positioning step portion 52 provided on an outer periphery of the second end 18b. Consequently, axial movement of the inner ring 50 with respect to the worm shaft 18 is regulated. A bearing hole 53 is formed in the housing 17 to hold the second bearing 34. The bearing hole 53 is formed as a bias hole that allows the second bearing 34 to be biased in directions in which a center distance D1 between the worm shaft 18 and the worm wheel 19 increases and decreases.

The center distance D1 is a distance between a center axis C1 of the worm shaft 18 that is the center of rotation of the worm shaft 18 and a center axis C2 of the worm wheel 19 that is the center of rotation of the worm wheel 19. The direction in which the center distance D1 decreases corresponds to a preloading direction Y2 in which a bias member 60 described below applies a preload. The direction in which the center distance D1 increases corresponds to an opposite preloading direction Y1 opposite to the preloading direction Y2. The bias member 60, which is, for example, an annular leaf spring, is interposed between an inner periphery of the bearing hole 53 and an outer ring 54 of the second bearing 34. The bias member 60 biases the second bearing 34 in the preloading direction Y2 (corresponding to the direction toward the worm wheel 19) in which the center distance D1 decreases, to apply a preload to the second end 18b. The bias member 60 is a thin-plate-like member formed of, for example, sheet metal.

Figure 3:
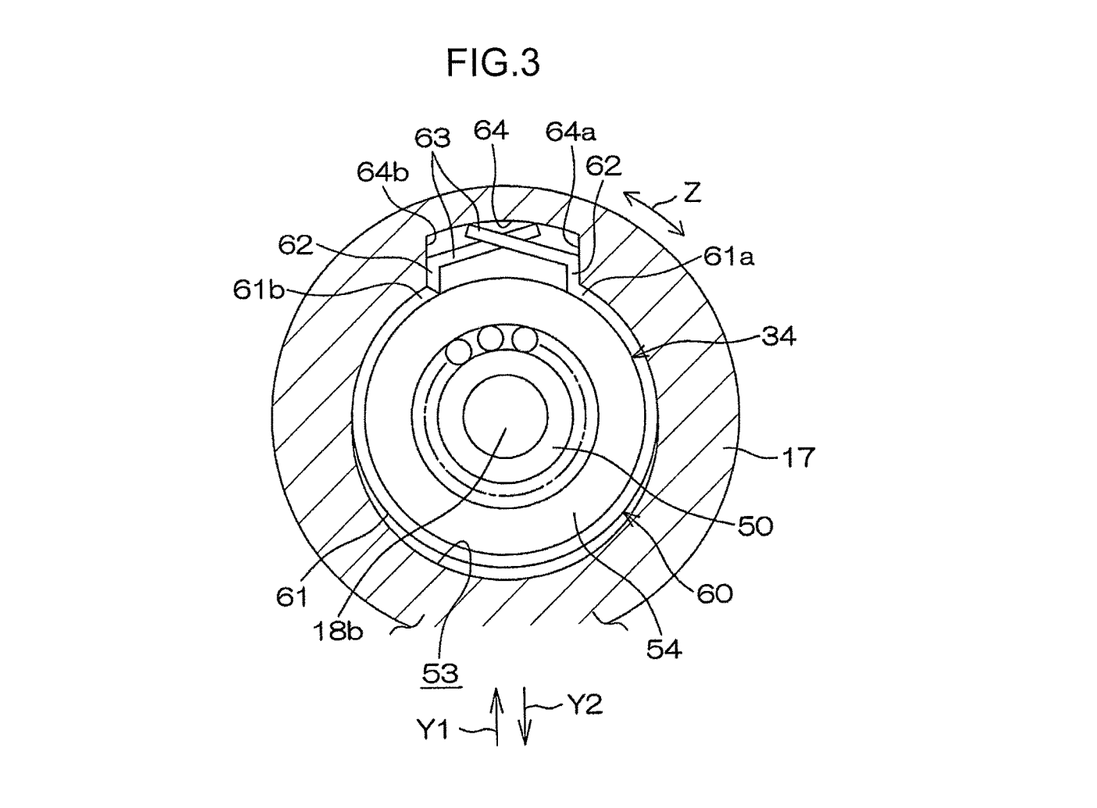
FIG. 3 is a schematic sectional view taken along line III-III in FIG. 2, depicting a structure that supports a second end of a worm shaft.
Figure 4:
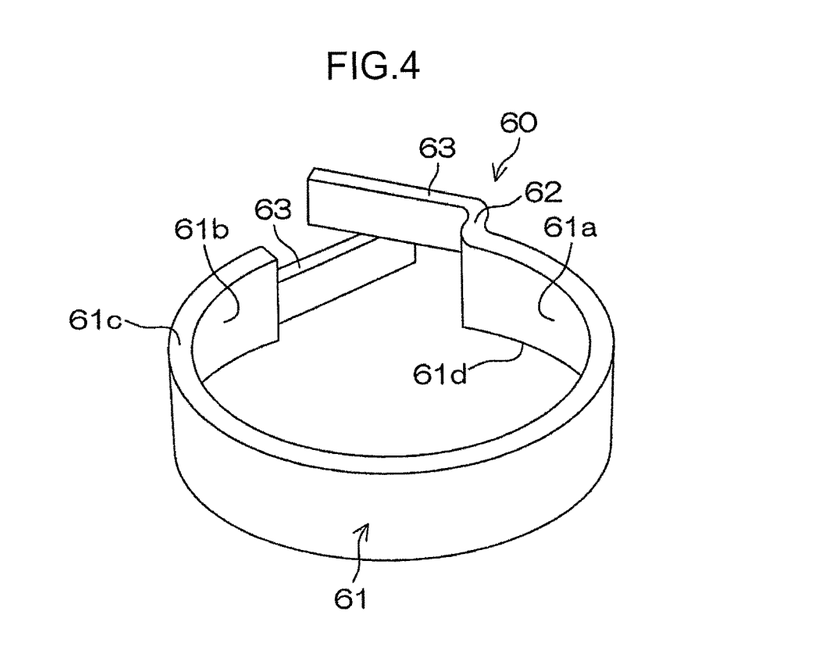
FIG. 4 is a schematic perspective view of a leaf spring serving as a bias member that allows backlash of the worm speed reducer to be eliminated.

As seen in FIG. 3 that is a sectional view taken along line III-III in FIG. 2 and FIG. 4 that is a perspective view, the bias member 60 includes a body portion 61 shaped like an ended ring, a pair of rotation regulating portions 62, and a pair of cantilevered elastic tabs 63. The body portion 61 surrounds an outer periphery 54a of the outer ring 54 of the second bearing 34. The rotation regulating portions 62 extend so as to be bent at a first end 61a and a second end 61b, respectively, that are ends of the body portion 61 in a circumferential direction. The elastic tabs 63 extend so as to be bent at the respective rotation regulating portions 62.

The width of each rotation regulating portion 62 is smaller than the width of the body portion 61. The body portion 61 is held against the inner periphery of the bearing hole 53 in the housing 17 by frictional engagement. As depicted in FIG. 4, one of the elastic tabs 63 is arranged close to a first side edge 61c, whereas the other elastic tab 63 is arranged close to a second side edge 61d, with the elastic tabs 63 staggered. As seen in FIG. 3 again, in a part of the inner periphery of the bearing hole 53 in the housing 17, a receiving recess portion 64 is formed which is recessed in a direction (opposite preloading direction Y1) opposite to the worm wheel 19 (preloading direction Y2) with respect to the second bearing 34.

Distal ends of the elastic tabs 63 are received by a bottom of the receiving recess portion 64 of the bearing hole 53. A bias force of each of the elastic tabs 63 biases the second end 18b of the worm shaft 18 via the second bearing 34 in the preloading direction Y2 in which the center distance D1 decreases. The receiving recess portion 64 has a pair of inner walls 64a and 64b in which the inner walls 64a and 64b face each other in a circumferential direction Z of the bearing hole 53. The rotation regulating portions 62 of the bias member 60 are in abutting contact with the corresponding inner walls 64a and 64b. Consequently, rotation of the bias member 60 in the circumferential direction Z of the bearing hole 53 is regulated.

Figure 5:
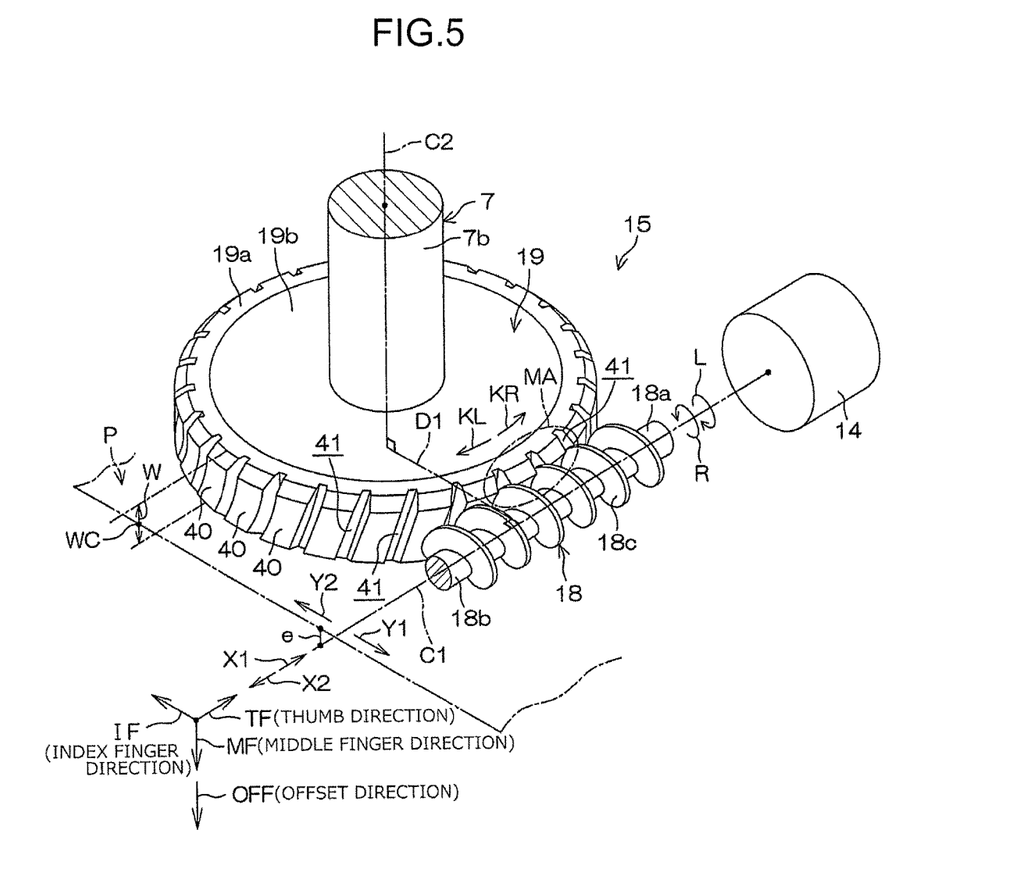
FIG. 5 is a schematic perspective view of an important part of the worm speed reducer.
Figure 6A:
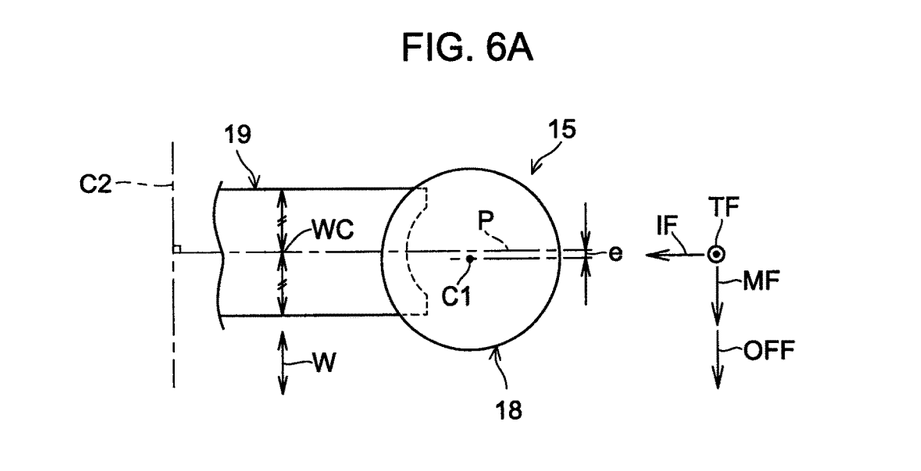
FIG. 6A is a schematic diagram of the worm speed reducer as viewed in an axial direction of the worm shaft with a right-hand thread.

FIG. 5 is a schematic perspective view of an important part of the worm speed reducer 15. FIG. 6A is a schematic diagram of the worm speed reducer 15 viewed along the axial direction of the worm shaft 18. As depicted in FIG. 5 and FIG. 6A, the center axis C1 of the worm shaft 18 is offset in an offset direction OFF by an offset distance e from a plane P that is orthogonal to the center axis C2 and that passes through a center position WC of the worm wheel 19 in a tooth width direction W.

When the worm shaft 18 is configured like a right-hand thread as in the present embodiment, the offset direction OFF is defined in a left-handed coordinate system. That is, in the left-handed coordinate system, when a direction X1 toward the first end of the worm shaft 18 in the axial direction (a direction toward the first end 18a and the electric motor 14) is set to correspond to a thumb direction, and the preloading direction Y2 is set to correspond to an index finger direction IF, the offset direction OFF corresponds to a middle finger direction MF.

Figure 6B:
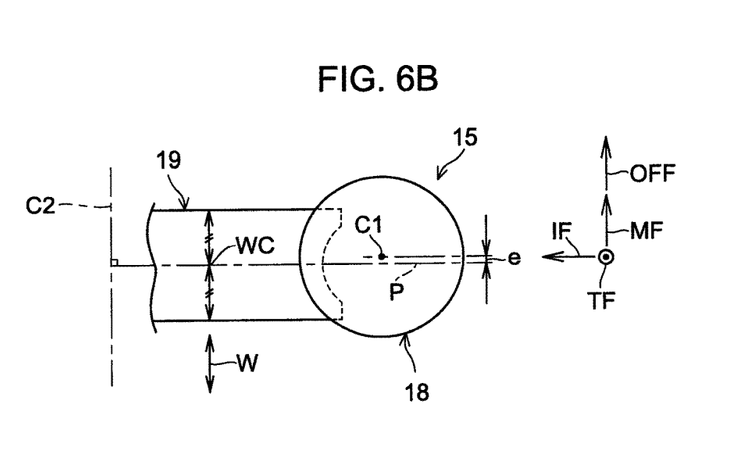
FIG. 6B is a schematic diagram of the worm speed reducer as viewed in an axial direction of the worm shaft with a left-hand thread.

But as shown in FIG. 6B, if the worm shaft is configured like a left-hand thread, the offset direction is defined in a right-handed coordinate system. That is, in the right-handed coordinate system, when the direction toward the first end of the worm shaft in the axial direction (the direction toward the electric motor) is set to correspond to the thumb direction, and the preloading direction is set to correspond to the index finger direction, the offset direction corresponds to the middle finger direction. As depicted in FIG. 5, tooth grooves 41 are each formed between adjacent teeth 40 of the worm wheel 19. In a meshing area MA, the tooth portion 18c of the worm shaft 18 is meshed with the tooth grooves 41 of the worm wheel 19.

When the right-hand-thread-like worm shaft 18 is driven to make a clockwise rotation R (clockwise as viewed from the first end 18a), the worm wheel 19 rotates in a first rotating direction KR (counterclockwise in FIG. 5). In contrast, when the worm shaft 18 is driven to make a counterclockwise rotation L (counterclockwise as viewed from the first end 18a), the worm wheel 19 rotates in a second rotating direction KL (clockwise in FIG. 5).

Figure 7:
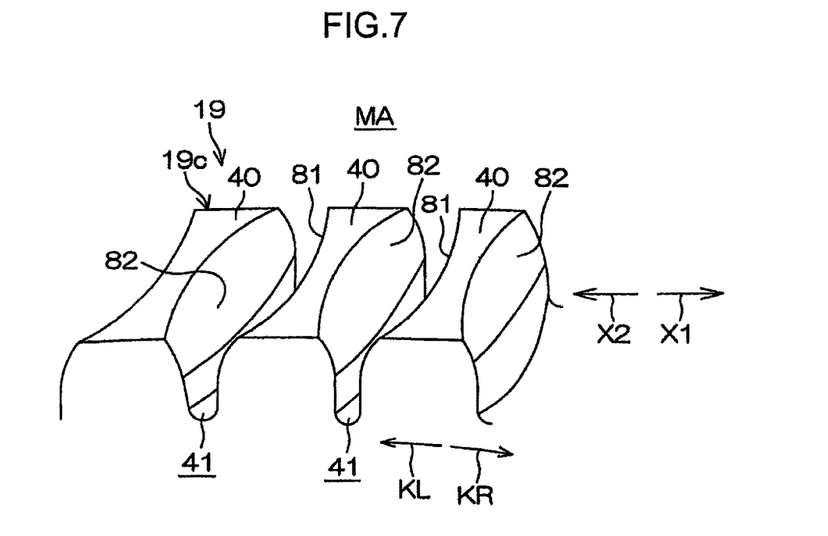
FIG. 7 is an enlarged perspective view of an important part of a worm wheel.

FIG. 7 is an enlarged view of the tooth portion 19c of the worm wheel 19 in the meshing area MA. As depicted in FIG. 7, each of the tooth grooves 40 in the worm wheel 19 is defined by a first tooth flank 81 and a second tooth flank 82 that face each other in the rotating direction. In the meshing area MA, the first tooth flank 81 corresponds to a tooth flank in the direction X1 toward the first end of the worm shaft 18 in the axial direction, and the second tooth flank 82 corresponds to a tooth flank in a direction X2 toward the second end of the worm shaft 18 in the axial direction.

Figure 8A:
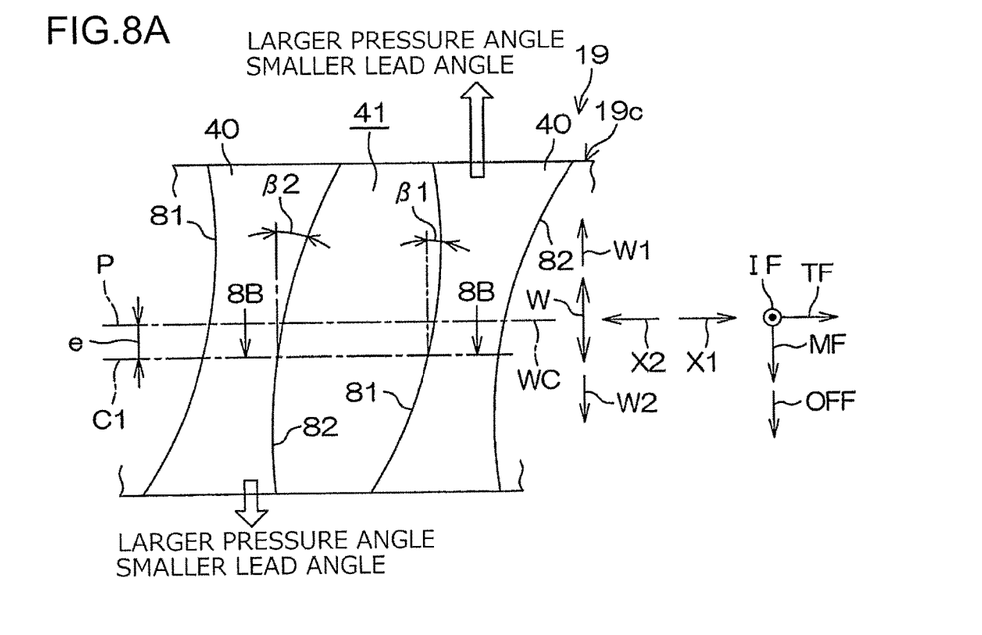
FIG. 8A is an enlarged view of a tooth portion of the worm wheel, corresponding to a diagram of the worm wheel as viewed from a radially outward direction.

When the worm shaft 18 makes clockwise rotation R, the second tooth flank 82 of the worm wheel 19 serves as a meshing tooth flank. When the worm shaft 18 makes a counterclockwise rotation L, the first tooth flank 81 of the worm wheel 19 serves as a meshing tooth flank. As depicted by a white arrow in FIG. 8A that is an enlarged view of the tooth portion 19c of the worm wheel 19, the pressure angle of the first tooth flank 81 increases and the lead angle of the first tooth flank 81 decreases toward one side W1 in the tooth width direction W (in a direction opposite to the offset direction OFF). In contrast, the pressure angle of the second tooth flank 82 increases and the lead angle of the second tooth flank 82 decreases toward the other side W2 in the tooth width direction W (in the offset direction OFF).

Figure 8B:
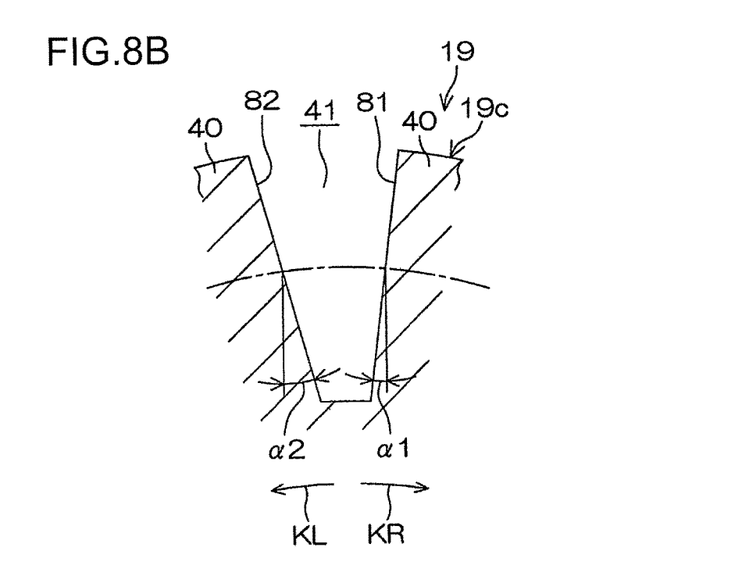
FIG. 8B is a sectional view of the tooth portion of the worm wheel, corresponding to a sectional view taken along line 8B-8B in FIG. 8A.

In areas of the tooth flanks 81 and 82 cut by a plane that contains the center axis C1 of the worm shaft 18 and that is parallel to the plane P, the lead angle β2 of the second tooth flank 82 is smaller than the lead angle β1 of the first tooth flank 81 (β2<β1). As depicted in FIG. 8B that is a sectional view taken along line 8B-8B in FIG. 8A, in areas of the tooth flanks 81 and 82 cut by the plane that contains the center axis C1 of the worm shaft 18 and that is parallel to the plane P, the pressure angle β2 of the second tooth flank 82 is larger than the pressure angle α1 of the first tooth flank 81 (α2>α1).

Figure 9A:
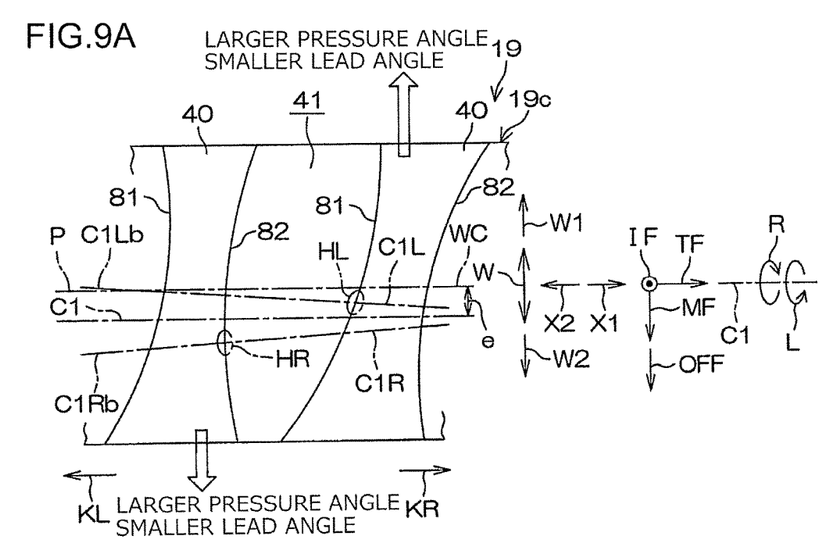
FIG. 9A is an enlarged view of the tooth portion of the worm wheel of the present embodiment.

FIG. 9A schematically depicts arrangement of the center axis C1 of the worm shaft 18 obtained when no load is imposed on the worm shaft 18, a center axis C1R of the worm shaft 18 obtained when the worm shaft 18 makes a clockwise rotation R, and a center axis C1L of the worm shaft 18 obtained when the worm shaft 18 makes a counterclockwise rotation L. The center axis C1 of the worm shaft 18 obtained when no load is imposed on the worm shaft 18 is parallel to the plane P. When the worm shaft 18 makes a clockwise rotation R, the second tooth flank 82 of the tooth flanks 81 and 82 serves as a tooth flank contacting the worm shaft 18. At this time, a second end portion C1Rb of the center axis C1R is inclined with respect to the center axis C1 in the case of no load so as to be displaced in the offset direction OFF. Consequently, a tooth contact area HR that comes into contact with the worm shaft 18 is formed on the second tooth flank 82.

In contrast, when the worm shaft 18 makes a counterclockwise rotation L, the first tooth flank 81 of the tooth flanks 81 and 82 serves as a tooth flank contacting the worm shaft 18. At this time, a second end portion C1Lb of the center axis C1L is inclined with respect to the center axis C1 in the case of no load so as to be displaced in the direction opposite to the offset direction OFF. Consequently, a tooth contact area HL that comes into contact with the worm shaft 18 is formed on the first tooth flank 81.

Figure 9B:
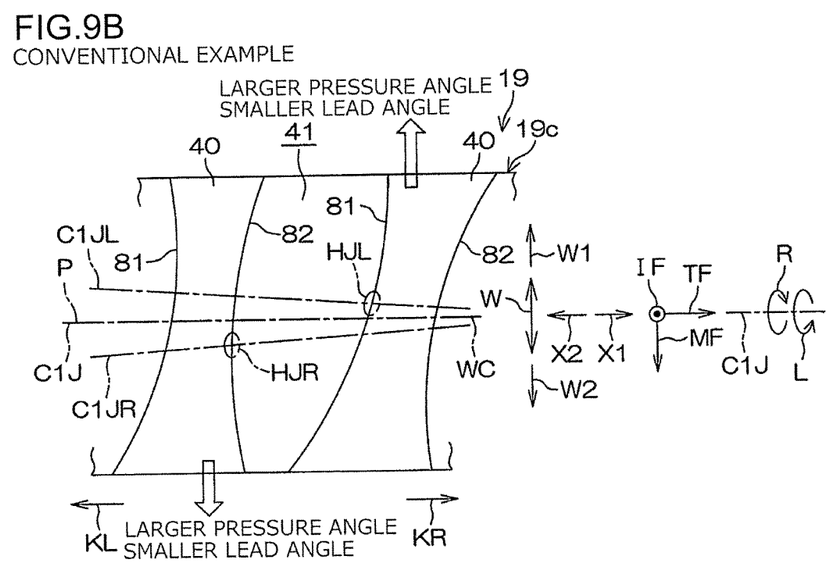
FIG. 9B is an enlarged diagram of a tooth portion of a worm wheel in a conventional example.

On the other hand, FIG. 9B depicts, in a conventional example in which a center axis C1J of the worm shaft 18 is arranged in the plane P, arrangement of the center axis C1J of the worm shaft 18 obtained when no load is imposed on the worm shaft 18, a center axis C1JR of the worm shaft 18 obtained when the worm shaft makes a clockwise rotation R, and a center axis C1JL of the worm shaft 18 obtained when the worm shaft 18 makes a counterclockwise rotation L.

As depicted in FIG. 9B of the conventional example, a tooth contact area HJR is formed on the second tooth flank 82 when the worm shaft 18 makes a clockwise rotation R, and a tooth contact area HJL is formed on the first tooth flank 81 when the worm shaft 18 makes a counterclockwise rotation L.

When the worm shaft 18 makes a clockwise rotation R, the tooth contact area HR of the present embodiment in FIG. 9A is positioned away from the position of the tooth contact area HJR in the conventional example in FIG. 9B, in the offset direction OFF. Thus, when the worm shaft 18 makes a clockwise rotation R, the pressure angle at the tooth contact area HR of the present embodiment is larger than the pressure angle at the tooth contact area HJR in the conventional example. When the worm shaft 18 makes a clockwise rotation R, the lead angle at the tooth contact area HR of the present embodiment is smaller than the lead angle at the tooth contact area HJR in the conventional example. Consequently, a frictional resistance torque can be reduced which is generated when the worm shaft 18 makes a clockwise rotation R to make the second tooth flank 82 serve as a meshing tooth flank.

When the worm shaft 18 makes a counterclockwise rotation L, the tooth contact area HL of the present embodiment in FIG. 9A is positioned away from the position of the tooth contact area HJL in the conventional example in FIG. 9B, in the offset direction OFF (toward the other side W2 in the tooth width direction W). Thus, when the worm shaft 18 makes a counterclockwise rotation L, the pressure angle at the tooth contact area HL of the present embodiment is smaller than the pressure angle at the tooth contact area HJL in the conventional example. When the worm shaft 18 makes a counterclockwise rotation L, the lead angle at the tooth contact area HL of the present embodiment is larger than the lead angle at the tooth contact area HJL in the conventional example. Consequently, a frictional resistance torque can be increased which is generated when the worm shaft 18 makes a counterclockwise rotation L to make the first tooth flank 81 serve as a meshing tooth flank.

As described above, the present embodiment reduces the frictional resistance torque generated when the second tooth flank 82 serves as a contact tooth flank, while increasing the frictional resistance torque generated when the first tooth flank 81 serves as a contact tooth flank. Consequently, a difference in frictional resistance torque due to a difference in rotating direction is suppressed. The present invention is not limited to the above-described embodiment. For example, a worm shaft configured like a left-hand thread may be used, and the right-handed coordinate system may be used to set the offset direction. That is, the offset direction of the center axis of the worm shaft configured like a left-hand thread is opposite to the offset direction in the case where the worm shaft is configured like a right-hand thread. In addition, various changes may be made to the present invention within the scope recited in the claims.

What is claimed is:

1. A worm speed reducer, comprising:
   a worm shaft having a first end coupled to an electric motor such that the worm shaft is driven by the electric motor, and a second end opposite to the first end in an axial direction of the worm shaft;
   a worm wheel with pairs of tooth flanks, each pair defining a tooth groove;
   a housing that houses the worm shaft and the worm wheel and that supports the second end of the worm shaft such that the second end is able to pivot around the first end of the worm shaft; and
   a bias member that is supported by the housing and that elastically biases the second end of the worm shaft in a preloading direction in which a center distance between the worm shaft and the worm wheel decreases, wherein:
   a center axis of the worm shaft is parallel to but offset in an offset direction from a plane that is orthogonal to a center axis of the worm wheel and that passes through a central position of the worm wheel in a tooth width direction, and
   (i) in a left-handed coordinate system for a case where the worm shaft is configured with a right-hand thread or (ii) in a right-handed coordinate system for a case where the worm shaft is configured with a left-hand thread, when a direction toward the first end of the worm shaft corresponds to a thumb direction and the preloading direction corresponds to an index finger direction, the offset direction corresponds to a middle finger direction.

2. The worm speed reducer of claim 1, wherein the worm shaft is configured with the right-hand thread.

3. The worm speed reducer of claim 1, wherein the worm shaft is configured with the left-hand thread.

\* \* \* \* \*